(12) United States Patent
Bodin et al.

(10) Patent No.: US 7,720,966 B2
(45) Date of Patent: May 18, 2010

(54) ARRANGEMENTS AND METHOD FOR HIERARCHICAL RESOURCE MANAGEMENT IN A LAYERED NETWORK ARCHITECTURE

(75) Inventors: Ulf Bodin, Lulea (SE); Joachim Johansson, Lulea (SE); Joakim Norrgard, Lulea (SE); Fredrik Pettersson, Lulea (SE); Olov Schelen, Norrfjarden (SE); Jim Sundqvist, Lulea (SE); Emil Svanberg, Lulea (SE)

(73) Assignee: Netsocket, Inc., Plano, TX (US)

( * ) Notice: Subject to any disclaimer, the term of this patent is extended or adjusted under 35 U.S.C. 154(b) by 298 days.

(21) Appl. No.: 10/535,208

(22) PCT Filed: Nov. 14, 2003

(86) PCT No.: PCT/SE03/01767

§ 371 (c)(1),
(2), (4) Date: May 17, 2005

(87) PCT Pub. No.: WO2004/051944

PCT Pub. Date: Jun. 17, 2004

(65) Prior Publication Data

US 2006/0036719 A1 Feb. 16, 2006

Related U.S. Application Data

(60) Provisional application No. 60/430,098, filed on Dec. 2, 2002.

(51) Int. Cl.
*G06F 15/173* (2006.01)
*G06F 15/16* (2006.01)
*H04L 12/56* (2006.01)

(52) U.S. Cl. .................. 709/225; 709/223; 709/224; 709/245; 370/392

(58) Field of Classification Search .............. 709/223, 709/224, 245; 370/392
See application file for complete search history.

(56) References Cited

U.S. PATENT DOCUMENTS 6,188,691 B1 * 2/2001 Barkai et al. ............ 370/390

(Continued)

FOREIGN PATENT DOCUMENTS

EP 1 089 506 A2 4/2001

(Continued)

OTHER PUBLICATIONS

RFC 1662: PPP in HDLC-like Framing, Jul. 1994, The Internet Engineering Task Force (IETF).*

(Continued)

*Primary Examiner*—Nathan Flynn
*Assistant Examiner*—Jeong S Park
(74) *Attorney, Agent, or Firm*—Slater & Matsil, L.L.P.

(57) ABSTRACT

A data network, method and a computer program product, wherein the data network is implemented by a first network level (104) having a first addressing scheme and at least a second network level (108) having a second addressing scheme. Each network level provides connectivity over at least one network domain. A first group of Network Resource Managers, NRMs, (b-d)) is arranged to control the resources of the first network level and a second group of NRMs (e-g) is arranged to control the resources of the second network level. The NRMs of the first group (b-d) and second group (e-g) exchange resource requests by using the first addressing scheme and the NRMs (e-g) of the second group perform an address mapping between the first and second addressing schemes.

17 Claims, 2 Drawing Sheets

U.S. PATENT DOCUMENTS

| | | | |
|---|---|---|---|
| 6,654,363 B1 | 11/2003 | Li et al. | |
| 2001/0033646 A1* | 10/2001 | Porter et al. | 379/243 |
| 2003/0118019 A1* | 6/2003 | Mark et al. | 370/392 |
| 2005/0027843 A1* | 2/2005 | Bozak et al. | 709/223 |

FOREIGN PATENT DOCUMENTS

| | | |
|---|---|---|
| EP | 1 113 628 A2 | 7/2001 |

OTHER PUBLICATIONS

Yavatkar, R., et al., "SBM (Subnet Bandwidth Manager): A Protocol for RSVP-based Admission Control over IEEE 802-style networks," Network Working Group, Request For Comments: 2814, May 2000, pp. 1-60.

Sato, K-I., et al., "GMPLS-Based Photonic Multilayer Router (Hikari Router) Architecture: An Overview of Traffic Engineering and Signaling Technology," IEEE Communications Magazine, Mar. 2002, pp. 96-101.

Sander, V., et al., "End-to-End Provision of Policy Information for Network QoS," Proceedings of the Tenth IEEE Symposium on High Performance Distribution Computer (HPDC), Aug. 2001, pp. 1-12.

Schelén, O., "Quality of Service Agents in the Internet," Doctoral Thesis, Luleå University of Technology, Aug. 1998, pp. 1-107.

Dugeon, O., et al., "From SLA to SLS up to QoS Control: The CADENUS framework," IST/CADENUS project, http://www.cadenus.org/papers, WTC, 2002, 7 pgs.

* cited by examiner

ARRANGEMENTS AND METHOD FOR HIERARCHICAL RESOURCE MANAGEMENT IN A LAYERED NETWORK ARCHITECTURE

FIELD OF THE INVENTION

The present invention relates to a data network, a method and a computer program product. In particular, the present invention relates to resource management in a data network having a layered network architecture.

BACKGROUND

A current networking trend is to provide "IP all the way" to wired and wireless units. Some objectives are to simplify the infrastructure, to support a wide range of applications, and to support diverse user demands on the communication service. A consequence of this is that the heterogeneity of the IP networks increases, both from a business perspective and from a technical perspective. From a business perspective, some providers offer services for particular application segments without having their own network infrastructure. Instead they operate overlay networks by acquiring transmission capacity from IP network providers. An overlay network is a logical layer four service network running on top of a real IP network. From a technical perspective, having IP as the general-purpose network layer, the range of used link layer technologies is increased.

A design trade-off made to enable interconnection was to support only best-effort service at the network level. Best-effort service provides adequate support for traditional data applications that can tolerate delay, loss and varying throughput along the path. However, in networks carrying high loads of traffic, this type of service is often inadequate for meeting the demands of applications that are more sensitive to packet loss and delay e.g. telephony, video on demand, multimedia conferencing, etc. It is also insufficient to separate the services for priority businesses.

One trend is to simplify the infrastructure by running all kinds of applications and support all kinds of customers, with various network service demands, in the same logical IP network i.e. the Internet. This means that IP becomes the unifying communication technology i.e., the network layer. Consequently the environment in which IP must operate becomes more heterogeneous in the following aspects: the application heterogeneity in IP networks is increasing, the link layer heterogeneity is increasing, including Asynchronous Transfer Mode (ATM), Multiprotocol Label Switching (MPLS), Local Area Network (LAN), Virtual LAN (VLAN), Wireless LAN (WLAN), Global Service Mobile (GSM), Universal Mobile Telephony System (UMTS), etc, the user community is becoming more heterogeneous in terms of service expectations and willingness to pay for the service e.g. professional users and home entertainment users, and the business range is becoming more diverse including a mixture of network providers and service providers that specialise on different overlay services and peer-to-peer applications.

All these trends point towards the Internet becoming a ubiquitous multi-service network. Consequently, there are strong commercial reasons for service providers, network operators and equipment providers to offer unified solutions for ensured Quality-of-Service (QoS) in IP networks.

There are several challenges in providing end-to-end services over an IP network spanning various kinds of link layer technologies: a) IP routers and link layer switching devices should be kept simple and not be burdened with additional processing or signalling functionality. b) The link layers may have a vast range of build-in functionality for service management that should be interfaced e.g., ATM and 3G wireless has plenty of functionality, while LAN and WLAN has very little. c) The services must be able to manage in a uniform way by the network operators, both at IP level and inside particular link-layer networks. d) The services must be transitively ensured in a hierarchy of business overlays as well as over a chain of peer providers co-operating to offer particular services.

The entity performing dynamic service management in a provisioned network is here called a Network Resource Manager (NRM) (other commonly used terms for this entity are bandwidth broker, bandwidth manager, network resource controller, network agent, etc.). This entity keeps track of available resources and performs admission control on incoming requests for resources from clients. To perform admission control the NRM stores a history of previously admitted resource reservations. The NRM manager takes decisions to admit new requests for resources based on the total amount of available resources, the amount currently reserved by previously reservations and the amount of resources requested. The resources may or may not be scheduled over time.

There are specific requirements for resource management mechanisms. To provide service to end users, they must be aware of network resources and may schedule them for the committed service at any granularity e.g. for a port range, for aggregate traffic between a pair of subnets, etc. There are currently very few known specifications and implementations of NRMs. Only some of them handle reservations involving multiple domains, i.e. inter-domain reservations between peering network operators. These are described below. None of them handle the heterogeneous and hierarchical aspects of specific link-layers and overlay networks.

In Olov Schelén, "Quality of Service Agents in the Internet", Doctoral Thesis, Department of Computer Science and Electrical Engineering, Division of Computer Communication, Luleå University of Technology, Luleå, 1998 an NRM is described that handles resource management on the IP-level, intra-domain and inter-domain, through peering. It includes IP topology awareness, admission control, resource scheduling over time and aggregation towards destination domains. It is a pure IP network layer solution that does not handle specific link layer solutions or hierarchies of service providers.

P. Pan, E. Hahne, and H. Schulzrinne have developed a protocol called Border Gateway Resource Protocol (BGRP). They aggregate reservations with the same destination in the border router in the source domain. This solution is focused on IP-level inter-domain resource management for IP network operators, running Border Gateway Protocol (BGP).

The QBone Signaling workgroup has specified a protocol for inter-domain QoS signalling called SIBBS. The concept relies on signalling each reservation request hop by hop between instances of NRMs. End-to-end admission control is provided with some limited aggregation. In V. Sander et al, "End-to-End Provision of Policy Information for Network QoS", The University of Chicago, inter-domain reservations and signalling between different resource managers are discussed and two models of signalling is primarily discussed.

There are a number of projects that have designed architectures for service management. One of these projects is Cadenus [IST Cadenus: Creation and Deployment of End-User Services in Premium IP networks]. In the Cadenus model, disclosed in O. Dugeon, A. Diakonescu: "From SLA to SLS up to QoS control: The CADENUS Framework", WTC'2002, http://www.cadenus.org/papers, there are units for access mediation, service mediation, resource mediation, and network control. The Resource Mediation component resembles what is denoted as NRM in this specification.

Drafts disclosed in IETF Next Step In Signaling (NSIS) working group: http://www.ietf.org are primarily focused on path-coupled signalling hop-by-hop between signalling aware routers. One proposal, named CASP, is claimed to provide also path-decoupled signalling that possibly could be used between instances of NRMs.

For RSVP-based signalling, which is router centric and stateful, there has been a proposal for a Subnet Bandwidth Manager (SBM) to handle resource management in one specific link layer technology known as 802.x LANs described in R. Yavatkar et al. "SBM (Subnet Bandwidth Manager): A Protocol for RSVP-based Admission Control over IEEE 802-style networks". IETF. RFC 2814.

The technologies described above, except SBM and CADENUS, focus on resource management at the IP network layer only. All proposals are quite static in supporting hierarchical resource management for specific link-layers. In the case of Cadenus, there is a technology dependent Network Controller that can handle particular link-layer technologies. In the case of SBM, it acts as a black-box admission controller for RSVP like signalling to provide admission control inside a particular kind of link layer network. This provides a solution only for IEEE 802 link layer technologies.

Thus the proposed solutions provide either single level IP resource management or strict link-level resource management. This means that none of these solutions provide uniform resource management for the unifying communication technology that IP network layer has become i.e., including various applications and overlay networks as well as different link layer technologies. More specifically, the proposed solutions have the following drawbacks:

- None of the proposed solutions provide uniform service management for hierarchies of customers and providers i.e., overlay network service providers, Virtual Private Networks (VPNs), Enterprises, etc. being customers to different networks operators.
- They do not provide a general model for handling resources in hierarchies of link layer solutions, allowing some solutions to use internal support for resource management and providing other solutions with full support for network resource management at particular sub-levels of IP.
- Service management is complicated from an operator's point of view because separate tools/views are needed to manage different link layer technologies.
- End-to-end services can not be provided effectively because the admission control architecture does not connect IP network layer resources and link layers specific resources seamlessly.
- No automated services through self management by customers can be offered since there is no unified solution for service invocation over the different protocol layers i.e., the IP network layer and underlying link layers.

In addition to the above mentioned drawbacks, the proposed solutions have the following limitations:

- Network operators obtain little feedback on the booking levels, currently and over time, in networks and sub-networks since the proposed solutions do not support synchronized and unified scheduling of resources at both these layers.
- For link layer management, current solutions do no clearly separate the functions for sub-network control such as control of a domain with devices and functions for device control such as control of specific devices. Consequently, adding support for new devices is cumbersome since that may affect the functions for sub-network control.

SUMMARY OF THE INVENTION

In heterogeneous environment, providers in hierarchies at various business levels need to cooperate and ensure services between each other. Moreover, subnets inside the IP network are link-layer topologies that have various levels of built-in management functionality. To offer a uniform, consistent and seamless view for service management in such heterogeneous IP networks, there is a need for scalable solutions for dynamic resource management supporting various kinds of overlay networks and link-layer technologies. As mentioned above the prior art solutions provide either a single level IP resource management or strict link-level resource management, which implies that it is neither possible to have a uniform service management nor a general resource management for different layers.

Thus, the object of the present invention is to provide a general resource management extending different protocol layers.

The data network according to the present invention, comprising a first group of Network Resource Managers, NRMs, arranged to control the resources of the first network level and a second group of NRMs arranged to control the resources of the second network level, wherein the NRMs of the first group and second group comprise means for exchanging resource requests by using the first addressing scheme, and wherein the NRMs of the second group further comprise means for performing an address mapping between the first and second addressing schemes, makes it possible to provide a general resource management extending different protocol layers.

The method according to the present invention, comprising the steps of controlling the resources of the first network level by a first group of Network Resource Managers, NRMs, and controlling the resources of the second network level by a second group of NRMs, exchanging resource requests between NRMs of the first and second group by using the first addressing scheme, and performing an address mapping between the first and second addressing schemes, makes it possible to provide a general resource management extending different protocol layers.

Thus, the arrangements and method according to the present invention make it possible to provide feedback to network operators on booking levels, current and over time, in networks and sub-networks. This is enabled through synchronized and unified scheduling of resources at both these layers. The information may be provided in uniform graphs at all network levels.

Furthermore, the arrangements and method enables automated services through self-management by customers by offering a unified solution for service invocation covering both the IP network layer and underlying link layers. Such a unified solution for service invocation considerably reduce the complexity in allowing customers to self-manage their network accesses, service providers to self-manage their booked resources, and network operators to effectively provide transport of data.

An advantage with the present invention is that the proposed solution allows flexible extension of IP networks with new link-layer solutions and virtual service operators while still providing a unified model for management of services and resources across those of the IP and the link layers. The solution is applicable in individual network domains, over several link technologies, across several IP routing domains (autonomous systems), across several layers of service providers etc.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

A data network, a method and a computer program product according to the present invention may be implemented in a conventional data network implemented by at least a first 104 and a second 108 logical network level.

An example of such a conventional network is a multi-technology network where an operator provides an IP/MPLS backbone and several access networks based on various switched link layer technologies e.g., including an access network based on ATM switching, another access network based on Ethernet switching and a third based on WLAN technologies. Moreover, the network may comprise interconnectable routers, servers and other network elements known by a man skilled in the art.

In this application, a data network is defined as a switched network forwarding data units between network interfaces of network nodes using identifiers associated with the target circuit being setup through the network e.g., as in Asynchronous Transfer Mode (ATM networks and in Multiprotocol Label Switching (MPLS) networks, or a datagram network forwarding data units between network interfaces of network nodes using global addresses enabling local next-hop decisions made by each node e.g., as in Internet Protocol (IP) networks. The data units may be of fixed size e.g., ATM cells or of variable size e.g., IP packets using their destination addresses for datagram forwarding or using MPLS tags for switching.

The two levels mentioned above is a first 104 and second 108 network layer. In one embodiment of the present invention, the first network layer 104 is an IP layer and the second network layer 108 is a link layer. In another embodiment of the present invention, the first network layer is an IP layer 106 and the second network layer is a second IP layer or higher protocol layer, i.e. a protocol layer on top of the IP layer such as a transport protocol layer or an application protocol layer, used to control an overlay network 102. Thus, the overlay network may be implemented on a protocol level on top of the IP layer or on a second IP layer but using different addressing schemes from the first IP layer. When the overlay network is implemented on the second IP layer, the set of IP addresses of the overlay network is separated from the remaining IP address of the IP layer and when the overlay network is implemented on a protocol layer on top of the IP layer, separated sets of addresses are obtained automatically. The overlay network comprises a number of end-hosts, i.e. servers that may communicate end-to-end, e.g. peer-to-peer to offer a common service. There may be several levels of overlay networks which then results in a hierarchy of NRMs managing resources in these networks.

The data network, method and computer program product of the present invention require that the network comprises means for either implementing a single admission controlled forwarding class, or implementing forwarding classes differentiated or separated on packet or frame level where one or more traffic classes are subject to admission control.

Figure 1:
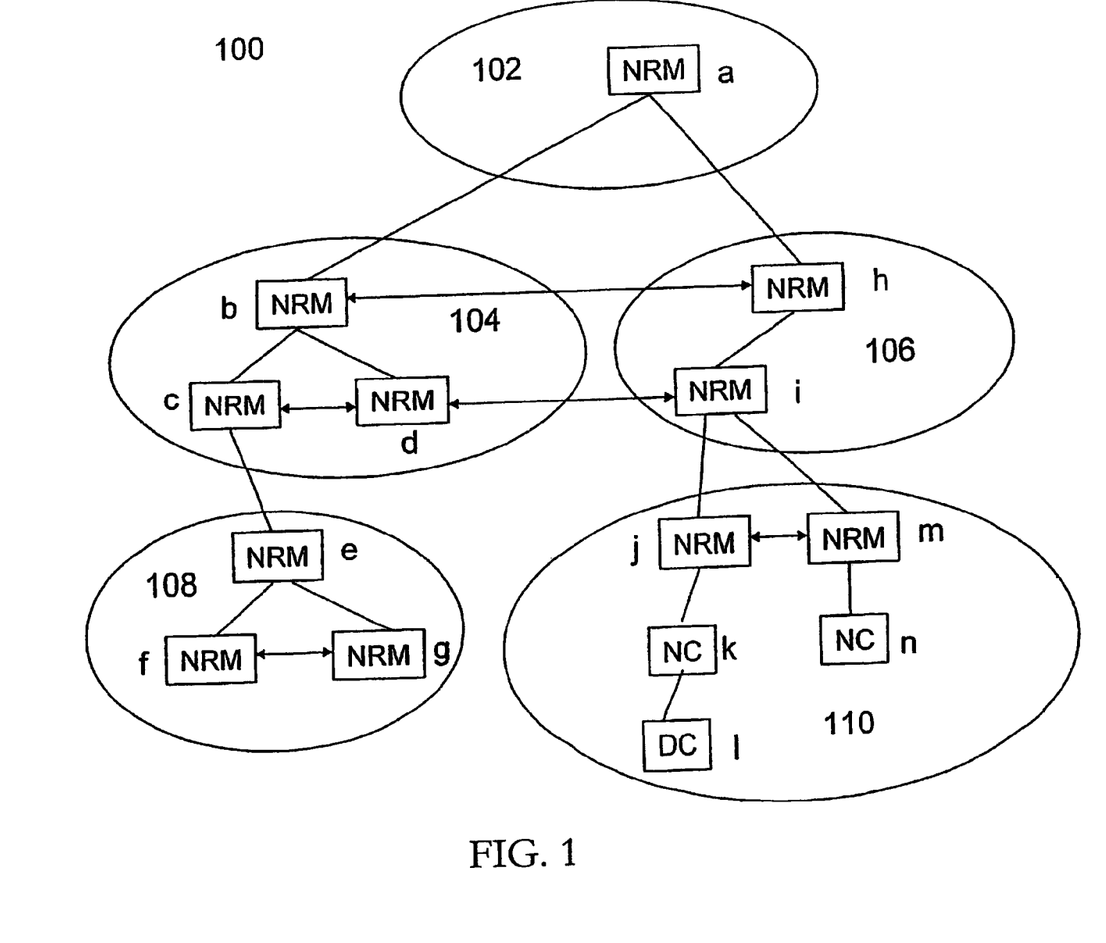
FIG. 1 is a schematic illustration of the network architecture according to the present invention.

The data network according to the present invention illustrated in FIG. 1 is implemented by a first network level 104 having a first addressing scheme and at least a second network level 108 having a second addressing scheme. Each network level provides connectivity over at least one network domain e.g., a routing domain, a provider network containing a number of private routing domains, an overlay network, a link layer subnet, or a part of a link layer subnet. A first group of NRMs b-d is arranged to control the resources of the first network level 104 and a second group of NRMs e-g is arranged to control the resources of the second network level 108, wherein the NRMs of the first group b-d and second group e-g comprise means for exchanging resource requests by using the first addressing scheme, and the NRMs of the second group e-g further comprise means for performing an address mapping between the first and second addressing schemes.

Two network levels i.e. a first and a second level may also be implemented by using the same protocol layer e.g. IP. A group of NRMs is then arranged to control the resources of each of these levels. The addresses used at these levels will be of the same type e.g. IP addresses but without a fixed mapping between these sets of addresses. The NRMs of the second group comprises means for performing an address mapping between the first and second addressing sets. E.g., the second network level may be a VLAN i.e. an overlay network carrying traffic with non-public IP addresses over the first network level that may be an IP network using public IP addresses.

The data network according to embodiments of the present invention comprises further:

A third network level 102 having a third addressing scheme, the resources of the third network level 102 is controlled by a third group of NRMs a. The third group of NRMs a comprises means for exchanging resource requests with NRMs of the first network level using the first addressing scheme. The NRMs of the third group comprise in accordance with one embodiment of the present invention means for performing a mapping between the third addressing scheme and the first addressing scheme. The third network level is, when the second network layer is a link protocol layer, according to one embodiment of the invention an IP layer or higher protocol layer, i.e. a protocol layer on top of the IP layer such as a transport protocol layer or an application protocol layer, used to control an overlay network. Thus, the overlay network may be implemented on a protocol level on top of the IP layer or on a second IP layer but using different addressing schemes from the first IP layer as mentioned above. In accordance with a further embodiment of the present invention, the third network level is a link protocol layer provided that the second network level is an overlay network.

One single logically centralised Network Resource Manager (NRM) for each network, e.g. for each IP routing domain i.e. Autonomous System (AS), for each link layer subnet, or for each overlay network. NRMs at AS-level may inter-operate through peering in a distributed fashion. The single logically centralised NRM may be distributed or backed up over several physical servers. Moreover, the logically centralised NRM may be a super- or sub-NRM that are defined below.

A hierarchy of sub-NRMs. A sub-NRM operates under one super-NRM and is responsible for a particular network sub-domain e.g., a network area of the super-domain. Those NRMs may have other sub-NRMs. A network area also known as routing area is a part of a routing domain where the topology is opaque to the rest of the domain. Note that a subnet-NRM always is a sub-NRM to a super-NRM, while a sub-NRM does not need to be a subnet-NRM. Also, there can be several levels of NRMs in a subnet, which means that a subnet-NRM can be a super-NRM to lower level subnet-NRMs (i.e., sub-NRMs to this super-NRM).

A Network Controller (NC) or a hierarchy of NCs for controlling or probing particular network sub-domains e.g., network areas of a super-domain. The network controller is a slave of an NRM and they do not implement resource management such as admission control. Instead, the NC serves an NRM by either probing a network domain for information or by injecting information into a domain.

One or many Device Controllers (DCs) for controlling particular network devices. DCs contain vendor specific interfaces and drivers. Each DC may interface with several devices of the same kind.

It should be noted that the NCs and DCs are not required if the NRM is used only as a decision support system. I.e., when the NRM is not used to reserve resources in the network. However, clients e.g., applications or overlay networks register their network usage with the NRM e.g. to collect information needed to upgrade the network to meet demands of the clients.

The entities in the architecture are related as directed graphs as shown in FIG. 1. Note that peering between siblings at each layer may occur to solve certain problems efficiently (as in FIG. 1 between MRM b and h and between NRM d and i). This may be exemplified by two adjacent link layer networks that are interconnected through several links or network interfaces. The NRMs in these networks may then need to peer with each other to distribute the load between the multiple interconnections.

As stated above, the functionality of an NRM is characterised by resource management capabilities for a given network domain e.g., a routing domain, a provider network containing a number of private routing domains, an overlay network, a link layer subnet, or a part of a link layer subnet. The NRM comprises means for keeping track of available resources inside its domain, including topology link resources and service commitments. Moreover, it comprises means for performing admission control for its domain in order to provide services to customers/clients. The topology managed by an NRM in a virtual overlay network or in a VPN may contain some clouds of unknown "real" topology. The topology managed by an NRM may also have a real topology of routers or switches. Thus, the NRM controls the real topology of routers or switches except in the overlay network case. According to the present invention, NRMs in real networks manage resources in IP level topologies and NRMs in subnets manage resources in link-layer subnet topologies. Note that there may be several levels of each kind of NRM managing the respective layer. To denote the entities forming a parent-child relation, the terms super-NRM and sub-NRM are used in this specification.

Consequently, the functionality of the NRMs is basically the same independently whether the NRM is managing the link layer, i.e. a subnet-NRM, or the IP layer in terms of capabilities for resource management in accordance with the present invention. The difference lies in their responsibilities and communication relations with other entities. The responsibility of a subnet-NRM is resource management including topology awareness and path-sensitive admission control for a specific subnet. A subnet, also denoted sub-network, is an IP network where all nodes can be reached directly with link layer, i.e. layer two, addressing/switching. In the routing table of all IP-nodes in a subnet there is normally a subnet mask, IP-prefix, matching the IP addresses for all nodes in that subnet, indicating that IP-packets can be sent directly to those nodes using the link layer addressing.

According to the present invention, the interface for making resource requests with an NRM is based on IP addresses independently of at which level the NRM is operating. By this, the present invention provides a uniform service management. A subnet-NRM managing a switched link layer topology using a different addressing scheme than the IP address is according to the present invention responsible for maintaining the mapping between a super-address and a sub-address that is associated with a super-address. A super-address may be an IP address and the sub-address may be a physical address for nodes in the subnet that are given a super-address e.g., edge nodes of the subnet such as a Broadband Remote Access Server (BRAS) in a Digital Subscriber Line (DSL) access network and internal nodes such as a Digital Subscriber Line Access Multiplexer (DSLAM) in a DSL network. This allows the super-NRM to request resources through and in the domain of a sub-NRM by just indicating the nodes between which resources is requested using its own address scheme.

According to one embodiment of the present invention, the sub-NRM is adapted to obtain the mapping between sub-addresses and super-addresses through NCs and DCs, respectively, which comprise means for probing devices such as Dynamic Host Configuration Protocol (DHCP) servers and Operational Support Systems (OSSes), or listening to signalling in establishing address mappings such as DHCP messages exchanged between a DHCP server and a client at a node in the subnet. The mapping between addresses can also be made by a super-NRM if it uses an addressing scheme different from IP. E.g., some overlay networks may use their own addressing schemes. Then, the super-NRM comprises means for obtaining mapping information similar to the means of the sub-NRMs for obtaining their mapping information.

Note that there may be cases when a sub-NRM manages a subnet or a network area that uses the same addressing scheme as its super-NRM. E.g., an overlay network may use the same addressing scheme as the network it uses to obtain connectivity between its nodes.

The implementation of any logically centralised NRM may be clustered or otherwise physically distributed according to embodiments of the present invention.

Each NRM may interact with a number of clients that try to connect to it. Control of whether particular clients are allowed to connect is performed through authentication. Control of their privileges is ensured through policies. The clients may be other entities that like to request resources e.g., peering NRMs, systems such call managers for Voice over IP (VoIP), overlay networks, applications such as video conference systems, etc. In addition, the clients may be entities that provide services that are vital to the operation of the NRM, such as sub-NRMs that provide resource management in a subnet, NCs that are prepared to provide information about the network managed by the NRM, etc. The entities that provide services to an NRM are once connected generally activated/controlled from that NRM.

A Network Controller (NCs) performs sub-tasks issued from one or more NRMs, typically implementing general purpose, i.e. vendor independent, functionality for probing and controlling particular areas of the network (e.g., an IP topology probe collecting a resource map through standard routing protocols and management information bases). According to one embodiment of the present invention, there is at least one NC in a domain of an NRM. The NC may be active, e.g. performing configurations, passive, e.g. just listening, or a mixture of both. NCs may process information in order to provide scalable and efficient communication with their NRM.

A Device Controller (DC), controlled by one or more NCs, is, in accordance with the present invention, controlling vendor specific node technologies. Thus, DCs implement vendor-specific drivers. There may be one or many DCs for each NC and each DC may control one or many physical nodes.

The DCs and the NCs may thus in accordance with one embodiment of the present invention be located in the IP and/or in the link layer and/or in the overlay network. Accordingly, the DCs and NCs may hence comprise IP- and/or link layer- and/or overlay network functionality.

The entities NRM, NC and DC communicate using general-purpose protocols and/or interfaces allowing functionality to be distributed over different devices/processes or to be co-located at one device/process. The protocols are typically implemented through a client server model with APIs providing a software interface e.g. shielding the protocol details. Each entity may act as both client and server, depending on where in the architecture they reside. Thus, the NRMs, NCs and DCs are typically implemented in software by a computer program product running on standard hardware.

Typically, but not mandatory, lower level entities inside an AS of a network provider register (upwards in FIG. 1) towards their super-NRM in a chain up to the AS-level NRM. A super-NRM may then use the services of selected sub-NRMs and NCs as if it was a client. Service providers and other customers e.g., enterprises that have their own overlay NRMs connect as clients (downwards in FIG. 1). Inside an AS, there is one logically centralised top-level network resource manager. At the inter-AS level, the NRMs communicate between each other according to a fully distributed model.

Below, the interaction between entities is described on a conceptual level. According to the present invention, there may be one general protocol available for any entity/customer requesting resources from an NRM. Customers may be end-hosts, application framework servers, other NRMs (peering-NRMs i.e. communicating NRMs on the same level, super-NRMs, etc). The present invention provides also support for both intra-domain requests and inter-domain requests, since the NRM handles resource requests between two addresses. In the intra-domain case, the NRM itself handles the request when both addresses are within the same domain. In the inter-domain case, the resources are reserved by communicating with a peer-NRM located in another NRM.

Examples of typical parameters, e.g. exchanged, distinguishing are disclosed below. It should however be noted that other parameters may be used, which is obvious for a man skilled in the art.

Examples of distinguishing parameters of the resource requests are: resources (e.g., bandwidth), source, destination addresses plus optional address masks, optional duration (start time, stop time), and optional path specification (e.g. only for some trusted clients).

The NC, that is arranged to act as a client to an NRM, comprises means for delivering detailed information, e.g. topology maps, traffic measurement information, alarms, etc. of the network domain that is controlled by the NRM. The NC may also comprise means for receiving detailed information on the traffic conditioner to be configured in the network domain. The data exchanged between an NC and an NRC may include: topology maps, traffic measurements, traffic conditioning information, etc.

The DCs are in one embodiment, for efficiency reasons, co-located with NCs but the DCs may also be located separately as well. Interaction with DCs typically includes any kind of information that can be read or written from specific devices. Examples of information to be read are interface speeds and provisioning information, and examples of information to be written are information about traffic conditioners i.e., token bucket shapers.

In the following, various roles for NRMs controlling a specific sub-network domain are explained. Some subnet domain uses technologies that have advanced support for resource management e.g., ATM networks. In this case the sub-NRM that handles such a resource aware sub-domain needs very little functionality. When admission requests are issued from a super-NRM, the sub-NRM simply translates the request (possibly through address mappings and other information obtained from an NC) to be executed by e.g. a built-in ATM resource manager. With this solution the ATM subnet remains a black box to the sub-NRM. Alternatively, the sub-NRM may maintain a topological database for the ATM subnet (by probing it) and provide resource management for it.

Certain subnet domains use technologies that have no internal support for resource management e.g., switched IEEE 802 networks. In this case it is advisable to have a sub-NRM that fully controls that resource un-aware sub-domain. That sub-NRM is arranged to use NCs and DCs located in the resource unaware domain to extract the topology of the subnet, perform traffic measurements etc. e.g. in order to provide adequate admission control.

Some domains use technologies that support mixed topologies i.e., each routing topology provides separate routes through the network. In some cases there is no straight hierarchy between these topologies. Instead, they are inter-dependent. An example of this is an IP/MPLS domain, where the basic topology may be determined through standard IP link-state routing protocols (e.g., OSPF, IS-IS) and is then used both for IP-based routing and for traffic engineered MPLS-Label Switched Paths (LSPs). Thus, both the IP and MPLS routing topology are based on the same basic topology of nodes and links (subnets). In this case, it is preferred to provide an NRM that handles resource management both by the IP and MPLS standard. In this case, at least one NC is responsible for IP routing topology awareness by using standard routing protocols and at least one NC is responsible for MPLS routing topology awareness by using DCs using MPLS MIBs and vendor specific command line interfaces.

The solution according to the present invention solves the above stated problems by providing a uniform service management for hierarchies of providers and customers i.e., network operators, overlay service providers, VPNs, enterprises by having NRMs at all levels using one single addressing scheme, e.g. the IP address. Thus, the NRMs provide a uniform service interface towards applications and may offer resource management with uniform addressing at all protocol levels, e.g. the IP level and the link level. Furthermore, a uniform service management from the operators' point of view is provided, since the NRMs are used at all levels with the uniform addressing. Thus, separate tools/views for different subnet technologies are avoided.

Providing a general model for handling resources in hierarchies of the link layer solutions by NRMs at all levels of the link layer where each sub-NRM provides resource management by using addresses of the super-domain. Each NRM may provide different functionality internally, ranging from providing simple mapping to sub-network resource management technology i.e., for sub-networks such as ATM and 3G wireless which have advanced resource management functionality built-in to full support for network resource management i.e., for sub-networks such as Ethernet that may not have any built-in functionality for resource management. In addition, end-to-end QoS is provided effectively because the data network according to the present invention connects the IP network layer resources and the link layer's specific resources seamlessly as described above.

The functions for network control and device control for link layer management are separated by using network controllers and device controllers. NCs control a network area as previously defined including many devices independent of the devices. DCs control individual devices using standard interfaces or vendor specific interfaces. There may be a specific DC for each kind of device such as routers, switches, traffic conditioning boxes, etc.

Figure 2:
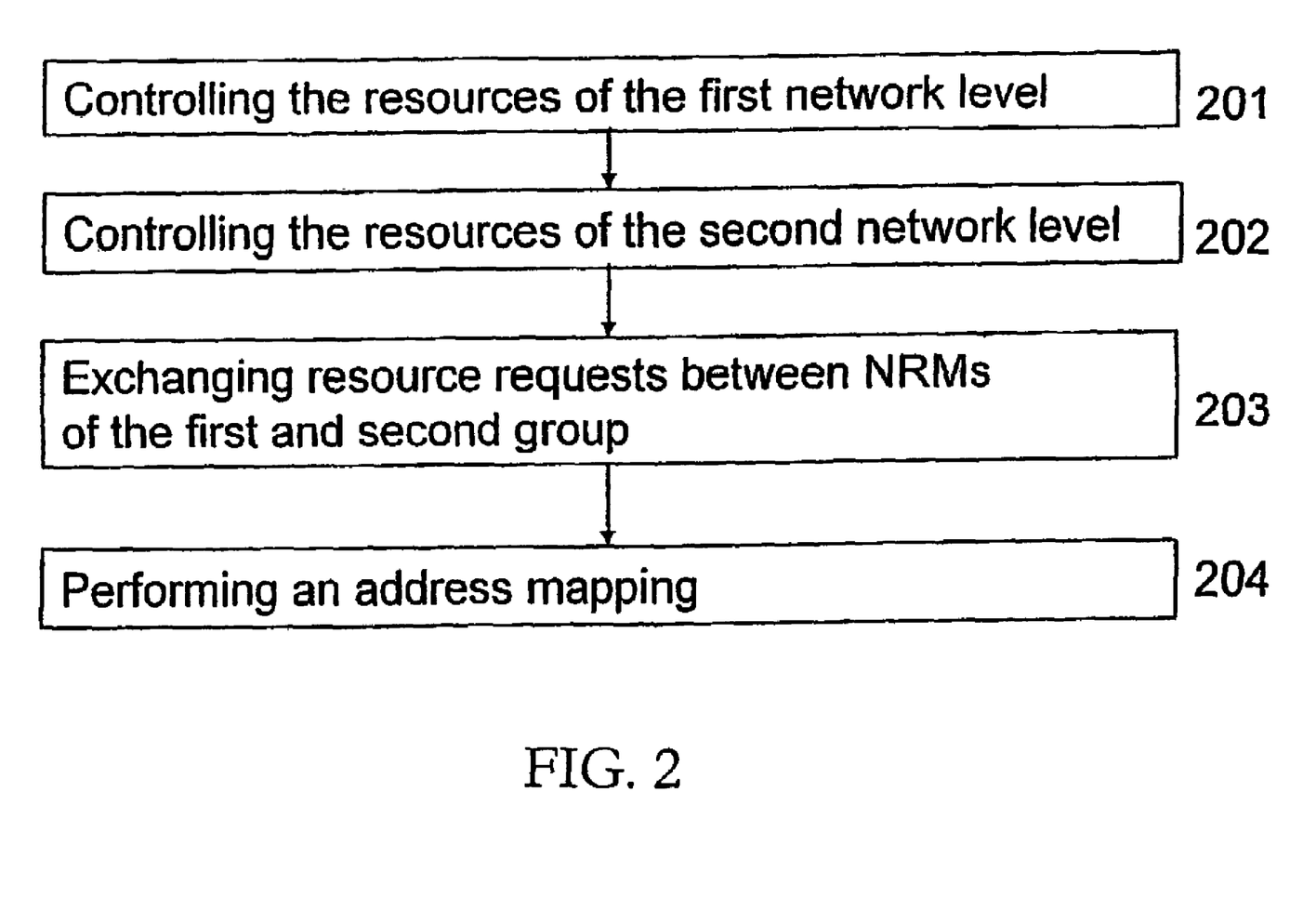
FIG. 2 is a flowchart of the method according to the present invention.

The method according to the present invention is applicable in a data network implemented by a first network level having a first addressing scheme and at least a second network level having a second addressing scheme each network level provides connectivity over at least one network domain. The method illustrated in the flowchart in FIG. 2 comprises the steps of:

201. controlling the resources of the first network level by a first group of Network Resource Managers, NRMs, and
202. controlling the resources of the second network level by a second group of NRMs,
203. exchanging resource requests between NRMs of the first and second group by using the first addressing scheme, and
204. performing an address mapping between the first and second addressing schemes.

As mentioned above, the functionality of the entities such as NRMs, NCs, and DCs used in the present invention may be implemented by a computer program product. The computer program product is directly loadable into the internal memory of a computer within a router or a server in the data network according to the present invention, comprising the software code portions for performing the steps of the method according to the present invention. The computer program product is further stored on a computer usable medium, comprising readable program for causing a computer, within a router or server in the data network according to the present invention, to control an execution of the steps of the method of the present invention.

In the drawings and specification, there have been disclosed typical preferred embodiments of the invention and, although specific terms are employed, there are used in a generic and descriptive sense only and not for purposes of limitation, the scope of the invention being set forth in the following claims.

The invention claimed is:

1. A method in a data network implemented by a first network level having a first addressing scheme and at least a second network level having a second addressing scheme, each network level providing connectivity over at least one network domain, the method comprising the steps of:
controlling resources of the first network level by a first group of Network Resource Managers (NRMs);
controlling resources of the second network level by a second group of NRMs, wherein the first group and the second group of NRMs comprise means for communicating on a common network level;
exchanging resource requests between the NRMs of the first and second groups using the first addressing scheme, the NRMs of the first group and the second group admitting new resource requests based at least in part on a total amount of available resources, an amount of resources currently reserved by previous reservations, and an amount of resources requested in the new resource requests; and
performing an address mapping between the first and second addressing schemes so that a set of resources that is used by a reservation in the second group, controlled and known by the second group, is aggregated into a single resource in the first group of NRMs.

2. The method according to claim 1, wherein the first network level is the Internet Protocol (IP) layer.

3. The method according to claim 2, wherein the second network level is a link protocol layer.

4. The method according to claim 2, wherein the second network level is a second IP layer controlling an overlay network on top of said IP layer.

5. The method according to claim 2, wherein the second network level is a second protocol layer controlling an overlay network on top of the IP layer.

6. The method according to claim 1, wherein the data network further comprises a third network level having a third addressing scheme and the method comprises the further steps of:
controlling resources of said third network level by a third group of NRMs; and
exchanging resource requests between any of the NRMs of the first and second network levels using the first addressing scheme.

7. The method according to claim 6, further comprising the step of:
performing an address mapping between the first and third addressing schemes.

8. The method according to claim 7, wherein the third network level is a third protocol layer controlling an overlay network on top of the IP layer.

9. The method according to claim 7, wherein the third network level is a second IP layer controlling an overlay network on top of said IP layer.

10. The method according to claim 7, wherein the third network level is a link protocol layer.

11. The method according to claim 1, wherein the NRMs within at least one of said groups are arranged in a hierarchical structure arranged to communicate with each other.

12. The method according to claim 1, wherein each of the NRMs is a logically centralized unit in a network.

13. The method according to claim 12, wherein said logically centralized unit is distributed or backed up over several physical servers.

14. The method according to claim 1, wherein the data network in at least one of the network levels comprises a Network Controller (NC), wherein the method comprises the further steps of:

receiving by the NC a request from an NRM; and obtaining detailed information including at least one of topology maps, traffic measurement information, and alarms of the network domain that is controlled by said NRM in response to said request.

15. The method according to claim 14, wherein the data network in at least one of the network levels comprises a Device Controller (DC), wherein the method further comprises the steps of:

receiving by the DC a request from the NC; and controlling vendor specific node technologies in response to said request.

16. The method according to claim 15, wherein the DC is co-located with the NC in the at least one of the network domains.

17. A computer program product stored on a computer usable medium, comprising readable program for causing a computer, within a router or a server in the data network to control an execution of the steps of claim 1.

* * * * *